United States Patent
Samukawa et al.

(10) Patent No.: US 7,755,534 B2
(45) Date of Patent: Jul. 13, 2010

(54) RADAR SENSOR FOR RECEIVING RADAR WAVE WHILE JUDGING EXISTENCE OF WAVE ATTENUATOR

(75) Inventors: Yoshie Samukawa, Kariya (JP); Yoshihiro Abe, Kariya (JP); Atsushi Kawakubo, Toyota (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 15 days.

(21) Appl. No.: 12/378,088

(22) Filed: Feb. 11, 2009

(65) Prior Publication Data

US 2009/0207079 A1 Aug. 20, 2009

(30) Foreign Application Priority Data

Feb. 15, 2008 (JP) .............................. 2008-034770

(51) Int. Cl.
*G01S 3/14* (2006.01)
(52) U.S. Cl. ........................ 342/104; 342/378; 342/432; 342/438
(58) Field of Classification Search ................. 342/104, 342/378, 432, 438
See application file for complete search history.

(56) References Cited

U.S. PATENT DOCUMENTS 5,784,023 A * 7/1998 Bluege ....................... 342/104
7,218,208 B2 * 5/2007 Kikuchi ...................... 340/435
7,652,560 B2 * 1/2010 Ohmura et al. ............. 340/436
2005/0174222 A1 8/2005 Kikuchi

FOREIGN PATENT DOCUMENTS

| JP | 10-282229 | 10/1998 |
|---|---|---|
| JP | 2003-156560 | 5/2003 |
| JP | 2003-320866 | 11/2003 |
| JP | 2005-140696 | 6/2005 |
| JP | 2006-051888 | 2/2006 |
| JP | 2006-292679 | 10/2006 |

* cited by examiner

*Primary Examiner*—Thomas H Tarcza
*Assistant Examiner*—Timothy A Brainard
(74) *Attorney, Agent, or Firm*—Harness, Dickey & Pierce, PLC

(57) ABSTRACT

A radar sensor receives a radar wave signal through a radome in each of antennas while judging existence of an attenuating thing in a detecting unit. This unit extracts a maximum level channel from receiving channels assigned to the antennas every modulation period, calculates a difference in signal level between the maximum level channel and each receiving channel every modulation period, sets each receiving channel corresponding to large level differences in one measuring period including plural modulation periods as a candidate channel every measuring period, increments a preliminary variable of each candidate channel every measuring period, increases a final variable each time the preliminary variable of at least one receiving channel reaches or exceeds a preliminary value in one measuring period, and judges in response to the final variable reaching a final value that the attenuating thing attenuates the radar wave directed toward the random.

8 Claims, 8 Drawing Sheets

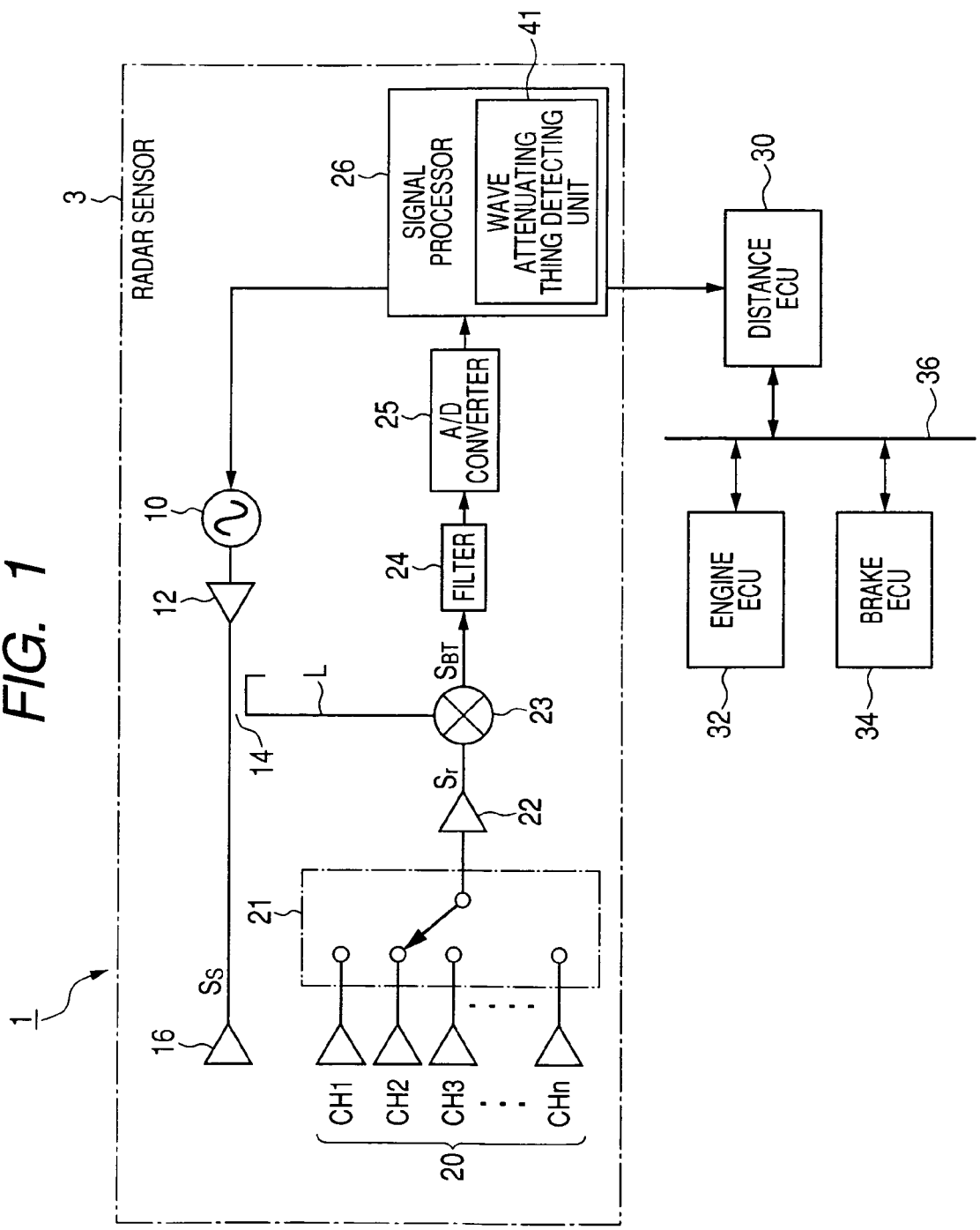

RADAR SENSOR FOR RECEIVING RADAR WAVE WHILE JUDGING EXISTENCE OF WAVE ATTENUATOR

CROSS-REFERENCE TO RELATED APPLICATION

This application is based upon and claims the benefit of priority of the prior Japanese Patent Application 2008-34770 filed on Feb. 15, 2008, so that the contents of which are incorporated herein by reference.

BACKGROUND OF THE INVENTION

1. Field of the Invention

The present invention relates generally to a radar sensor which receives a radar wave, reflected from a target object and transmitted through a wave transmission member, in a plurality of antenna elements, and more particularly to the radar sensor which judges the existence of a wave attenuator attenuating the radar wave directed toward the member.

2. Description of Related Art

A millimeter wave radar sensor disposed on a vehicle has been used for a vehicle trailing control and/or a vehicle collision predicting control. In this radar sensor, a millimeter wave is transmitted from a transmitting antenna to a target object (e.g., an obstacle or a preceding vehicle) placed in front of the current vehicle, and the millimeter wave reflected from the object is received by a receiving antenna. Then, a distance between the current vehicle and the object and a relative speed of the current vehicle to the object are calculated from the transmitted wave and the reflected wave. Therefore, the current vehicle can automatically trail the preceding vehicle or predict a collision with the preceding vehicle with high precision.

To prevent the radar wave from being attenuated in a window of the vehicle during the transmission of the wave, the radar sensor is not located in the vehicle compartment but is disposed on the front bumper placed outside the compartment. In this case, the radar wave is not transmitted through the window, so that this sensor can prevent the attenuation of the radar wave caused by the window. However, the radar sensor is exposed to the open air, so that various things such as turbid water, snow, dust, mud and the like are easily attached to a surface of a protecting member covering the receiving antenna of the sensor. These things soil the surface of the protecting member so as to attenuate the reflected wave. For example, the soiling things absorb or reflect a large portion of the reflected wave so as to reduce the electric power of the wave received in the receiving antenna. Therefore, the performance for detecting the object in the radar sensor is undesirably degraded, so that the reliability in the trailing control and the predicting control is lowered in the radar sensor. When the sensor detects the degradation of the object detecting performance, various types of control requiring the detection results of the sensor are stopped or partially performed.

To detect the degradation of this performance caused by various things attached to the protecting member of the receiving antenna, Published Japanese Patent First Publication No. 2003-320866 discloses a radar sensor for estimating a degree of the degradation of the object detecting performance. In this sensor, a frequency spectrum of the received signal (i.e., reflected radar wave) is calculated, and the reception amplitude at the spectrum peak of the frequency spectrum is always monitored. When the surface of the protecting member is heavily soiled, the amplitude at the spectrum peak is lowered. Therefore, the degradation level of the performance can be estimated from a change in the amplitude of the spectrum peak. For example, when the change becomes larger than a threshold value, the radar sensor judges that the object detecting performance is degraded.

Further, various reflected waves (i.e., multi-path reflected waves) passing through different transmission paths are sometimes received in receiving antenna for a short time. In this case, the interference of the reflected waves is caused so as to temporarily reduce the amplitude at the spectrum peak. To distinguish the performance degradation caused by the soiled or dirty surface of the protecting member from the performance degradation caused by the multi-path reflected waves, the continuation time of the reduction in the amplitude of the spectrum peak is measured. When this continuation time exceeds a predetermined period, the radar sensor judges that the performance degradation is continuously caused by various things soiling the surface of the protecting member.

The radar sensor has a plurality of antenna elements each of which receives a reflected radar wave. Each antenna element corresponds to a receiving channel. This radar sensor can detect a target bearing (i.e., a direction to the target object). To make a small-sized radar sensor, the number of antenna elements has been recently reduced. However, as the number of antenna elements is decreased, the adverse influence of the performance degradation in one antenna element on the precision in the bearing detection is enlarged.

To maintain the precision in the bearing detection to a high level, it is required to reliably judge whether or not the surface of the protecting member is soiled or made dirty. For reliable judgment, it is desired to heighten the detection sensitivity to the surface of the protecting member soiled or made dirty. For example, even when the reduction of the amplitude at the spectrum peak is small, the sensor is adjusted to judge that the performance degradation is caused by the soiled or dirty surface of the protecting member.

However, when this detection sensitivity is heightened, the performance degradation actually caused by multi-path reflected waves is detected by mistake as the performance degradation caused by the soiled or dirty surface of the protecting member. As a result, even when the performance degradation of the radar sensor is not caused by the soiled or dirty surface of the protecting member, various types of control using the radar sensor are undesirably stopped in response to a misjudgment.

SUMMARY OF THE INVENTION

An object of the present invention is to provide, with due consideration to the drawbacks of the conventional radar sensor, a radar sensor which receives a radar wave, reflected from a target object and transmitted through a wave transmission member, in a plurality of antenna elements while judging the existence of a wave attenuator attenuating the reflected radar wave directed toward the member with high precision.

According to an aspect of this invention, the object is achieved by the provision of a radar sensor which receives a radar wave, reflected from a target object and transmitted through a wave transmission member in each of a plurality of antenna elements corresponding to a plurality of receiving channels, as a received signal while judging existence of a wave attenuator attenuating at least one of the reflected radar waves. The radar sensor comprises a preparation block, a detecting block, a maximum level channel extracting block, a difference calculating block, a candidate channel setting block, a non-candidate channel setting block, a preliminary judgment variable incrementing block, a final judgment variable increasing block, and an outputting block. The preparation block sets each of a preliminary judgment variable and a final judgment variable at an initial value, assigns the preliminary judgment variable to each of the receiving channels, and sets a first period of time and a second period of time including one first period or a plurality of first periods. The detecting block detects an electric power level of the received signal received in each antenna element as the level of the corresponding receiving channel every first period. The maximum level channel extracting block extracts a maximum level channel, having a maximum level among the levels of the receiving channels, from the receiving channels every first period. The difference calculating block calculates a channel level difference between the maximum level of the maximum level channel and the level of each of the receiving channels other than the maximum level channel every first period. The candidate channel setting block sets one receiving channel corresponding to the channel level difference, which is calculated in one second period and is equal to or larger than a candidate threshold value, as a candidate channel for each of the receiving channels other than the maximum level channel every second period. The non-candidate channel setting block sets one receiving channel corresponding to the channel level difference, which is calculated in one second period and is smaller than a non-candidate threshold value being lower than the candidate threshold value, as a non-candidate channel for each of the receiving channels other than the maximum level channel every second period. The preliminary judgment variable incrementing block increments the preliminary judgment variable of each receiving channel each time the receiving channel is set as the candidate channel and initializes the preliminary judgment variable of each receiving channel each time the receiving channel is set as the non-candidate channel. The final judgment variable increasing block increases the final judgment variable by a renewal value each time the preliminary judgment variable of at least one receiving channel reaches or exceeds a preliminary judgment value in one second period. The outputting block outputs information indicating existence of the wave attenuator in response to the final judgment variable reaching a final judgment threshold value.

With this structure of the radar sensor, when one receiving channel has the channel level difference being equal to or larger than the candidate threshold value, the sensor does not immediately judge that the wave attenuator attenuates the reflected radar wave, but the receiving channel is set as a candidate for a channel on which an adverse influence of a wave attenuator is exerted. Then, when the receiving channel is repeatedly set as a candidate channel for a preliminary judgment period (a period required to increase the preliminary judgment variable to the preliminary judgment value), the increase of the final judgment variable is started. This increase is continued when at least one receiving channel is set as a candidate channel for the preliminary judgment period or more. The candidate channel denotes a candidate for a channel which receives electric power of the received signal reduced by a wave attenuator.

When at least one receiving channel set as a candidate channel for the preliminary judgment period or more exists for a final judgment period (a period required to increase the final judgment variable to the final judgment threshold value), the sensor finally judges that a wave attenuator exists. That is, the sensor detects the existence of a wave attenuator.

Therefore, when the level of one receiving channel is temporarily reduced due to the reception of multi-path reflected waves or the like, the receiving channel is set as a candidate channel. Therefore, the preliminary judgment variable of the receiving channel is repeatedly incremented for a short time. However, the increase of the final judgment variable is not started until the preliminary judgment variable reaches the preliminary judgment value. Accordingly, the sensor can prevent a misjudgment based on multi-path reflected waves or the like that a wave attenuator attenuates the reflected radar wave directed toward the wave transmission member.

Further, a wave attenuator is sometimes moved on/over the wave transmission member. In this case, the attenuator first attenuates the radar wave directed toward one receiving channel and attenuates the radar wave directed toward another channel at a next time. Therefore, even when the preliminary judgment variable of one receiving channel once reaches the preliminary judgment value to increase the final judgment variable, the receiving channel is set as a candidate for a channel (e.g., anon-candidate channel) which receives electric power of the received signal without being influenced by any wave attenuator, and the preliminary judgment variable of this channel is initialized. However, the preliminary judgment variable of another channel soon reaches the preliminary judgment value to continue increasing the final judgment variable. Accordingly, even when a wave attenuator is moved on/over the wave transmission member, the sensor can reliably detect the existence of the wave attenuator and can output information indicating the existence of the wave attenuator.

Moreover, the temporary reduction of the level in one receiving channel due to multi-path reflected waves or the like and the continuing reduction of the level in another channel due to a wave attenuator are sometimes caused simultaneously. However, in the present invention, the plurality of candidate channels can be set every first period. Therefore, even when one receiving channel corresponding to the temporary reduction of the level is set as a candidate channel, another receiving channel corresponding to the continuing reduction of the level can be reliably set as another candidate channel. Accordingly, even when both the temporary reduction and the continuing reduction of the levels are simultaneously caused, the sensor can reliably detect the existence of the wave attenuator and can output information indicating the existence of the wave attenuator.

BRIEF DESCRIPTION OF THE DRAWINGS

FIG. 1 is a block diagram of a vehicle control system having a radar sensor according to this embodiment of the present invention;

DETAILED DESCRIPTION OF THE PREFERRED EMBODIMENT

Figure 2A:
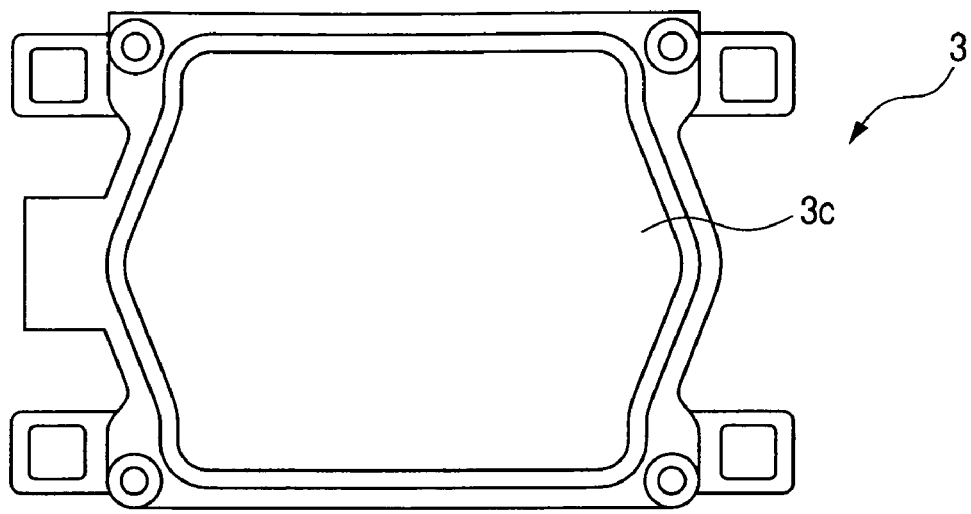
FIG. 2A shows a plan view of a radar sensor shown in FIG. 1.

An embodiment of the present invention will now be described with reference to the accompanying drawings.

FIG. 1 is a block diagram of a vehicle control system 1 having a radar sensor according to this embodiment.

As shown in FIG. 1, this vehicle control system 1 has a radar sensor 3 located on a front surface of the current vehicle to detect a target object (e.g., a preceding vehicle, a roadside object, an obstacle or the like) placed in front of the vehicle in a predetermined detecting area, a distance electronic control unit (ECU) 30 acting as an adaptive cruise control system to control a distance between the radar sensor 3 and the object according to information transmitted from the sensor 3, an engine ECU 32 for controlling a driving force produced in an engine of the vehicle according to an engine control signal transmitted from the distance ECU 30 though a local area network (LAN) communication bus 36, and a brake ECU 34 for controlling a braking torque produced by a brake of the vehicle according to a brake control signal transmitted from the ECU 30 though the bus 36. Each of the ECUs 30, 32 and 34 has a well-known microcomputer and a bus controller for controlling the communication between each of the other ECUs through the bus 36.

The radar sensor 3 is formed of a frequency modulated continuous wave (FM-CW) type electronically agile radar. This sensor 3 transmits a frequency-modulated radar wave of a millimeter wave band to the object and receives the wave reflected from the object. The sensor 3 detects the object from both the transmitted wave and the received wave and produces target information about the object and diagnosis information indicating conditions of the sensor 3 from the detection result. The target information includes information of a relative speed of the current vehicle to the object, information of a distance between the current vehicle and the object, and information of a target bearing (i.e., a direction from the current vehicle to the object). The diagnosis information includes information indicating degradation of the performance for detecting the object or no degradation of the detecting performance.

This detecting performance is degraded by a wave attenuating thing or matter (i.e., a wave attenuator) which attenuates the radar wave or beam directed toward a wave transmission member or intercepts the radar wave or beam from the member. This member covers and protects a plurality of radar wave receiving antennas of the sensor 3. When no wave attenuating things attenuate the radar wave directed toward the member, the radar wave is transmitted to the receiving antennas through the member.

The brake ECU 34 detects the condition of the brake pedal from detection data of an M/C pressure sensor (not shown) in addition to detection data (e.g., a steering angle and a yaw rate) of a steering sensor and a yaw rate sensor (not shown), outputs the condition of the brake pedal to the distance ECU 30, receives information of a target speed and a brake request from the distance ECU 30, and drives a brake actuator according to the condition of the brake pedal, the target speed information and the request to repeatedly open and close each of a pressure increasing valve and a pressure reducing valve of a brake hydraulic unit. Therefore, the brake ECU 34 can control the brake torque.

The engine ECU 32 transmits detection data (e.g., a vehicle speed detected in a vehicle speed sensor, engine control conditions detected in throttle angle sensors of an internal combustion engine, and an acceleration operating condition detected in an acceleration stroke sensor) to the distance ECU 30, receives information of a target speed, a fuel cut request and the like from the distance ECU 30, and drives throttle actuators according to the engine operating condition specified by the received information and request to adjust the throttle angle sensors. Therefore, the engine ECU 32 can control the driving force.

The distance ECU 30 receives the target information and the diagnosis information from the sensor 3, receives information of the vehicle speed and information of the engine control conditions from the engine ECU 32, and receives information of the steering angle, the yaw rate and the brake control condition from the brake ECU 34. The distance ECU 30 produces information of the target speed, the fuel cut request and the like from a setting value of a cruised control switch, a setting value of an inter-vehicle distance setting switch (not shown) and the target information of the sensor 3, performs the transmission of the information of the target speed and the fuel cut request to the engine ECU 32 as a control instruction, and performs the transmission of the information of the target speed and a brake request to the brake ECU 34 to adjust the distance from the preceding vehicle at a proper value.

Further, when the diagnosis information received from the sensor 30 indicates the degradation of the detecting performance, the distance ECU 30 performs a specific process to prohibit the use of the target information or allow the use of only a part of the target information.

Figure 2B:
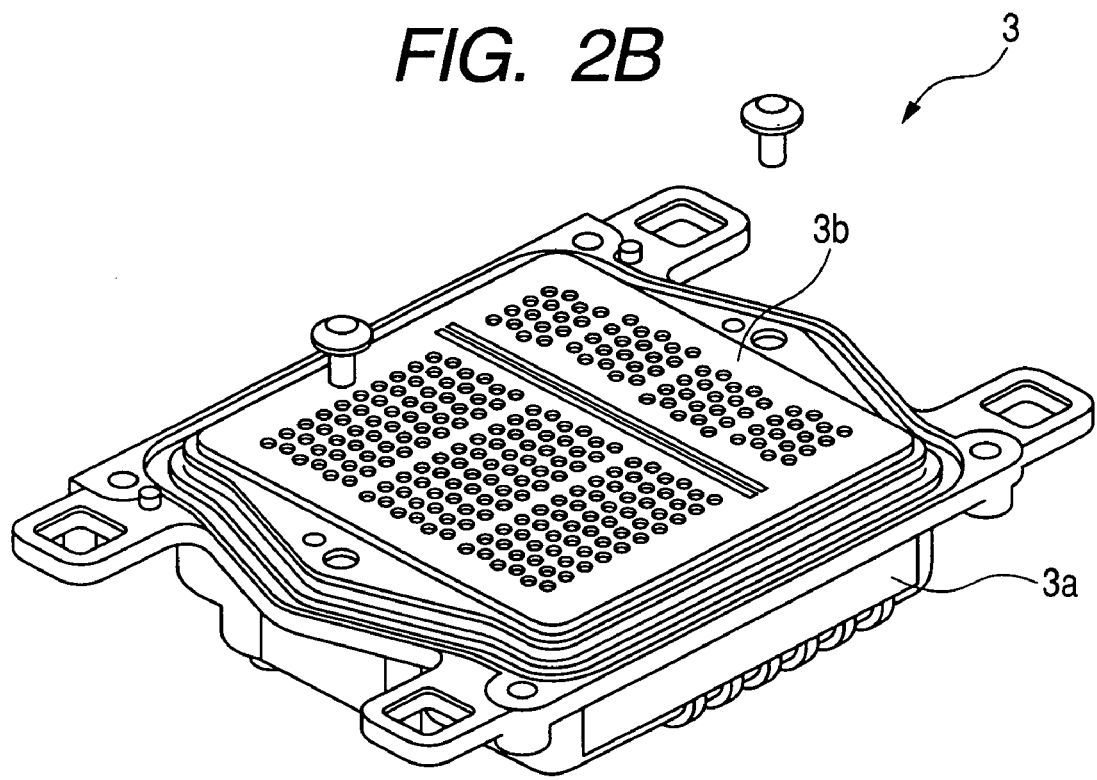
FIG. 2B shows a perspective side view of the radar sensor from which a radome is removed.

FIG. 2A shows a plan view of the radar sensor 3, while FIG. 2B shows a perspective side view of the sensor 3 from which a radome is removed.

As shown in FIG. 2A and FIG. 2B, the radar sensor 3 has a cap-shaped case 3a, an antenna substrate 3b attached to the case 3a so as to accommodate circuit elements and antenna elements attached to the substrate 3b in the open space of the case 3a, and a radome 3c attached to the case 3a to cover the substrate 3b with the combination of the case 3a and the substrate 3b formed in a box shape. The radome 3c is formed of specific resin through which the radar wave can be transmitted without attenuation. This radar sensor 3 is attached to the front bumper such that the radio wave is transmitted to the object through the radome 3c and is received through the radome 3c. Therefore, the radome 3c acts as a wave transmission member of the sensor 3, and the outer surface of the radome 3c acts as a wave receiving surface.

For example, wave attenuating things such as water, snow, dust, mud and the like are attached to the outer surface of the radome 3c as things covering, adhering to, coating or soiling the radome 3c or making the radome 3c dirty, wave attenuating things such as spots, stains and the like are formed on the outer surface of the radome 3c, or wave attenuating things such as dead leaves, metallic or non-metallic debris and the like covers the outer surface of the radome 3c. These attenuating things absorb or reflect a large portion of the radar wave directed to the radome 3c so as to reduce the electric power of the radar wave transmitted through the radome 3c.

Returning to FIG. 1, the radar sensor 3 has an oscillator 10 for generating a frequency-modulated high frequency wave of a millimeter wave band, an amplifier 12 for amplifying the high-frequency wave of the oscillator 10, a distributor 14 for distributing electric power of the amplified high-frequency wave to each of two signal lines to produce a transmitted signal Ss and a local signal $S_L$, and a transmitting antenna 16 for radiating a radar wave corresponding to the transmitted signal Ss. The signal Ss radiated from the radar sensor 3 is reflected by the target object and is returned to the sensor 3.

The radar sensor 3 further has a wave receiving section 20 for receiving the radar wave reflected from the object as a received signal Sr in each of a plurality of receiving antennas (i.e., antenna elements), a selector switch 21 for selecting each of the receiving antennas of the section 20 one by one, an amplifier 22 for amplifying the received signal Sr of the receiving antenna selected by the switch 21, a mixer 23 for mixing the amplified received signal Sr and the local signal $S_L$ obtained from the distributor 14 to produce a beat signal $S_{BT}$, a filter 24 for performing a filtering operation for the beat signal to remove unnecessary components from the beat signal, an analog-to-digital (A/D) converter 25 for converting an analog level of the beat signal into digital data to obtain the data as sampling data, and a signal processor 26 for controlling the oscillator 10, the switch 21 and the converter 25, performing the signal processing for the sampling data to produce the target information and the diagnosis information and communicating with the distance ECU 30 to receive the target speed information from the distance ECU 30 and to send the target information and the diagnosis information to the distance ECU 30.

A plurality of receiving channels $CH_1$ to $CH_N$ are allocated to the respective receiving antennas of the section 20. The processor 26 has a well-known microcomputer composed of a central processing unit (CPU), a read only memory (ROM) and a random access memory (RAM). The processor 26 further has an arithmetic processing unit (e.g., a digital signal processor) for performing the fast Fourier transform (FFT) for the sampling data of the converter 25. The processor 26 sets a modulation period of time and a measuring period of time such that a predetermined number of modulation periods (e.g., three modulation periods) are included in each measuring period. The processor 26 controls the oscillator 10 to start the wave generating operation every measuring period, to generate the frequency-modulated high frequency wave every modulation period, and to stop the wave generating operation in response to an elapse of three modulation periods. The processor 26 controls the switch 21 to select each of the receiving antennas predetermined times every reception period of time. Each reception period is slightly delayed from the preceding modulation period. The processor 26 controls the converter 25 to obtain one piece of sampling data every selection of the switch 21. The processor 26 produces and outputs the target information and the diagnosis information every measuring period.

The processor 26 has a wave attenuating thing detecting unit 41 to detect the existence of wave attenuating things which cover at least a portion of the outer surface of the radome 3c to attenuate the radar wave directed toward the radome 3c and at least one receiving antenna of the section 20.

With this structure of the radar sensor 3, when the oscillator 10 starts the driving operation, the oscillator 10 generates a high frequency wave, the amplifier 12 amplifies the wave, and the distributor 14 produces a transmitted signal Ss and a local signal $S_L$ from the amplified wave. The signal $S_L$ is sent to the mixer 23. The signal Ss is radiated from the antenna 16 as a radar wave and is reflected by the target object. This reflected signal is returned to the sensor 3 and is received in each of the receiving antennas of the receiving section 20 as a received signal Sr. The switch 21 selects each of the receiving channels CHi (i ranges from 1 to N) at a switching timing 512 times every reception period. The amplifier 22 amplifies the signal Sr of the receiving channel CHi every selection of the switch 21, and the mixer 23 produces a beat signal from the signal Sr and the local signal $S_L$. The filter 24 removes unnecessary components from the beat signal, the A/D converter 25 converts the beat signal into digital sampling data in synchronization with the switching timing of the switch 21, and the processor 26 performs the signal processing for the sampling data to produce target information and diagnosis information.

Figure 3:
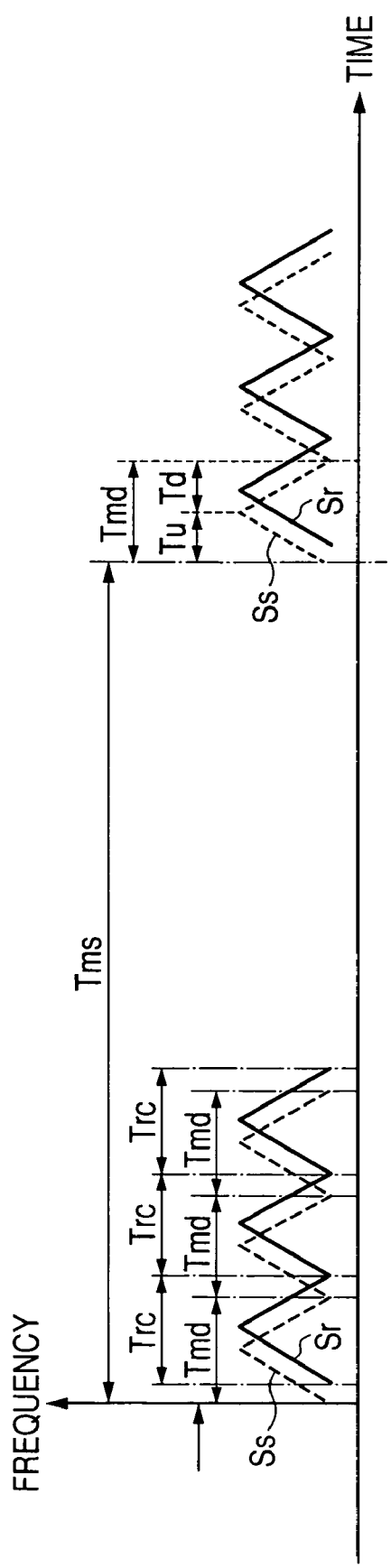
FIG. 3 is a time chart showing a change in frequency of each of a transmitted signal and a received signal.

To measure the target distance, the relative speed and the target bearing of the target information, a measurement method using an FM-CW type electronically agile radar is, for example, adopted. FIG. 3 is a time chart showing a change in frequency of each of the transmitted signal Ss and the received signal Sr.

As shown in FIG. 3, under control of the processor 26, the frequency of the signal Ss is linearly increased with time in an up period Tu and is linearly decreased with time in a down period Td. The sum of the periods Tu and Td forms one modulation period Tmd of time. The processor 26 transmits the signal Ss in the modulation period Tmd three times every measuring period Tms of time (e.g., 100 msec). The processor 26 controls the switch 21 to select each of the receiving antennas 512 times every reception period Trc of time. Each reception period Trc is delayed from the preceding modulation period Tmd by a delay time Td (Td=2×R/c; R denotes a target distance, and c denotes the speed of light). The processor 26 temporarily stores 512×N×3 pieces of sampling data every measuring period Tms and performs the signal processing for the sampling data every measuring period Tms.

The beat signal has a component which indicates an absolute difference in frequency between the signals Ss and Sr. When the speed of the current vehicle is the same as that of the target object, the frequency of the beat signal in the up period Tu is the same as that in the down period Td. In other words, the relative speed is indicated by the difference in frequency of the beat signal between the up and down periods. Therefore, the relative speed can be obtained from the beat signal.

The frequency of the beat signal is proportional to a propagation delay time ΔT equal to a turnaround time of the signal Ss required to go to and return from the target object. Therefore, the target distance can be obtained from the beat signal.

The receiving antennas of the section 20 are arranged in a certain rule, and there are time differences (or phase differences) in the reception of the signals Sr in the receiving antennas. These time differences are determined by directions of the target object from the respective receiving antennas, the positional relationship among the receiving antennas, and the frequency of the received signal Sr received in each receiving antenna. Therefore, the target bearing can be determined from the time differences.

Figure 4:
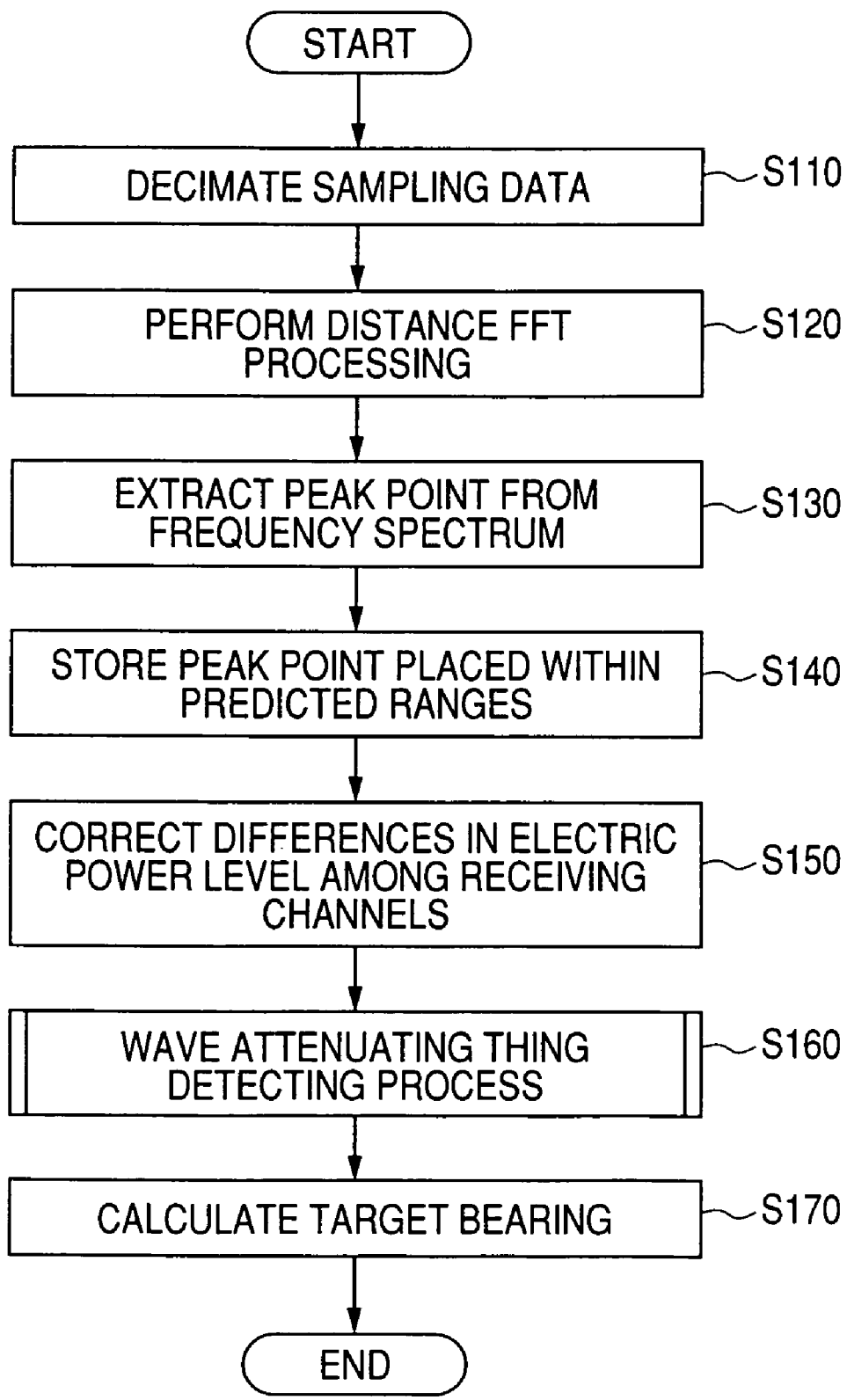
FIG. 4 shows a flow chart of the signal processing performed every measuring period of time in a processor shown in FIG. 1.

The processor 26 performs the signal processing every measuring period Tms. This signal processing will be described with reference to FIG. 4. FIG. 4 shows a flow chart of the signal processing performed every measuring period Tms in the processor 26.

As shown in FIG. 4, at step S110, the pieces of sampling data of the beat signal stored during three reception periods Trc are decimated every measuring period Tms. More specifically, the sampling data are demultiplexed in response to an elapse of the three reception periods Trc, and a first block of sampling data corresponding to each reception period Trc is produced. Each first block of sampling data is further demultiplexed to produce a second block of sampling data corresponding to each of the up and down periods. Each second block of sampling data is further demultiplexed by using a decimation filter to produce a third block of sampling data for each receiving channel. The reason that the decimation filter is used is as follows. The sampling data received from the converter 25 and multiplexed in the processor 26 corresponds to the N receiving channels, so that the sampling rate of the multiplexed sampling data is N times the sampling rate of the sampling data corresponding to one receiving channel. Therefore, demultiplication of each second block of sampling data to the third blocks of sampling data is equivalent to the decimation of over-sampled sampling data, so that the decimation filter is used in this demultiplication.

At step S120, well-known distance FFT processing is performed for each third block of sampling data to produce a frequency spectrum corresponding to each of the up and down periods of each reception period Trc for each receiving channel. The frequency spectrum of each receiving channel indicates the relationship between frequency and electric power changing with the frequency in the received signal Sr of the receiving channel.

At step S130, a peak point is extracted from each frequency spectrum while using a first peak extracting threshold value (e.g., 5 dB), and a frequency and an electric power level (i.e., a specific frequency and a specific level) at the peak point are specified. A frequency point corresponding to the maximum level in each frequency spectrum is set as the peak point. When a decibel ratio $10 \times \log_{10} P1/P2$ of the maximum level P1 to an level P2 of noise in each frequency spectrum is equal to or higher than the first peak extracting threshold value, the peak point is extracted from the frequency spectrum. In contrast, when the decibel ratio is lower than the threshold value, no peak point is extracted.

At step S140, a range of frequency and a range of electric power are predicted from the specific frequencies and the specific levels of the peak points (i.e., records) extracted in the past measuring periods Tms for each receiving channel, and it is judged whether or not the peak points of each receiving channel in this current measuring period Tms are placed within the predicted ranges of the receiving channel. When the peak point in this measuring period Tms is placed within the predicted ranges, the peak point is stored to be used for an object recognizing process required for the target information. In contrast, when the peak point is placed out of the predicted ranges, the peak point is abandoned. That is, only the peak point matching with the past peak points are adopted for each receiving channel.

At step S150, the process for correcting differences in the level among the receiving channels is performed for the specific levels of the peak points extracted at step S130. These differences are caused due to characteristics of the sensor 3. For this correction, when the outer surface of the radome 3c is made clean without being covered with any wave attenuating things, frequency spectra of the receiving channels are actually calculated in advance, and reference peak points of these frequency spectra are extracted. Correction values of the respective receiving channels are determined from levels of the reference peak points, and the correction value corresponding to each peak point extracted at step S130 is added to the specific level of the peak value, or the specific level of the peak value is multiplied with the corresponding correction value.

At step S160, based on the corrected specific levels and the specific frequencies of the peak points in the receiving channels, the detecting unit 41 of the processor 26 performs the wave attenuating thing detecting process in this measuring period Tms. More specifically, the processor 26 judges whether or not at least a portion of the outer surface of the radome 3c is covered with wave attenuating things attenuating the received signal Sr directed toward the receiving antennas of the section 20 and detects the existence of the wave attenuating things covering the outer surface of the radome 3c from the judging result.

At step S170, the target bearing is calculated from the corrected specific levels and the specific frequency of the peak points. To calculate the target bearing, the corrected specific levels placed at the same specific frequency are corrected from a plurality of receiving channels, and the well-known bearing FFT is performed for the corrected specific levels.

Figure 5:
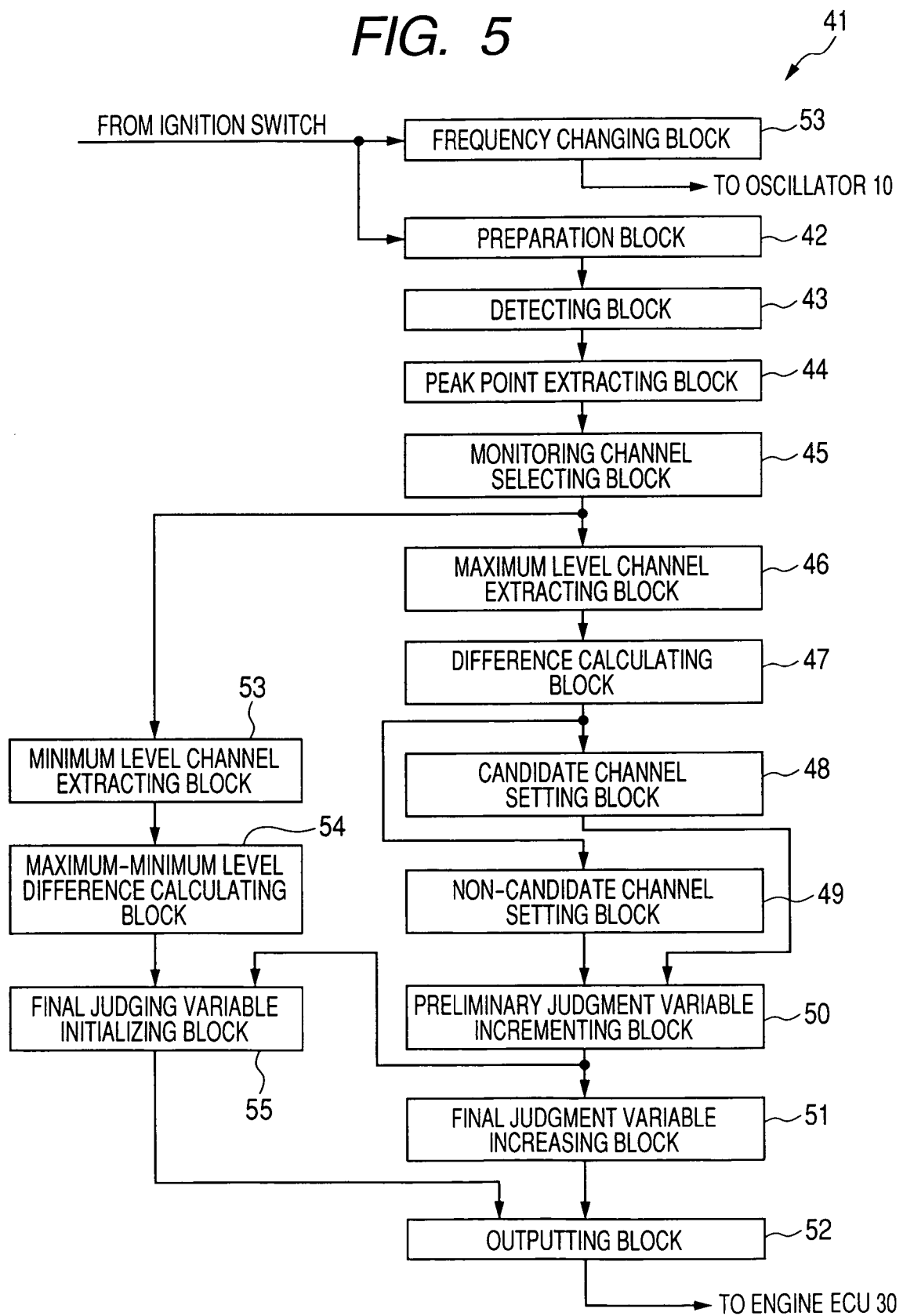
FIG. 5 is a block diagram of a wave attenuating thing detecting unit of the processor according to this embodiment.

FIG. 5 is a block diagram of the detecting unit 41 of the processor 26. To perform the wave attenuating thing detecting process at step S160, as shown in FIG. 5, the detecting unit 41 has a preparation block 42, a detecting block 43, a peak point extracting block 44, a monitoring channel selecting block 45, a maximum level channel extracting block 46, a difference calculating block 47, a candidate channel setting block 48, a non-candidate channel setting block 49, a preliminary judgment variable incrementing block 50, a final judgment variable increasing block 51, an outputting block 52, and a frequency changing block 53.

The changing block 53 changes the frequency of the radar wave with time to output the radar wave having the changing frequency from the sensor 3 to the target object.

The preparation block 42 sets a preliminary judgment variable and a final judgment variable at initial values and assigns the preliminary judgment variable to each of the receiving channels, and sets a reception period Trc and a measuring period Tms including a plurality of reception periods Trc.

The detecting block 43 detects an electric power level of the received signal Sr received in each receiving antenna of the section 20 as a level of the corresponding receiving channel every reception period Trc for each measuring period Tms.

The extracting block 44 produces a frequency spectrum, indicating a relationship between frequency and electric power of the received signal in each receiving channel, from the received signal Sr every reception period Trc, and extracts a peak point corresponding to a specific frequency and a specific level, which is largest among levels of each frequency spectrum, from the frequency spectrum.

The selecting block 45 selects, from each receiving channel, a monitoring channel having the peak point of which the specific frequency is placed within a predetermined frequency range and of which the specific level is higher than a peak level threshold value.

The extracting block 46 extracts a maximum level channel, having a maximum level among the specific levels of the monitoring channels, from the monitoring channels every reception period Trc.

The calculating block 46 calculates a channel level difference between the maximum level of the maximum level channel and the specific level of each of the monitoring channels other than the maximum level channel every reception period Trc.

The setting block 48 sets one monitoring channel corresponding to channel level differences, which are calculated in all reception periods Trc of one measuring period Tms and are equal to or larger than a candidate threshold value, as a candidate channel for each of the monitoring channels other than the maximum level channel every measuring period Tms. The candidate channel denotes a candidate for a channel which is assumed to receive electric power of the received signal Sr reduced by wave attenuating things.

The setting block 49 sets one monitoring channel, in which at least one of channel level differences calculated in all reception periods Trc of one measuring period Tms is smaller than a non-candidate threshold value being lower than the candidate threshold value, as a non-candidate channel for each of the monitoring channels other than the maximum level channel every measuring period Tms. The non-candidate channel denotes a candidate for a channel which is assumed to receive electric power of the received signal Sr without being influenced by any wave attenuating things.

The incrementing block 50 increments the preliminary judgment variable of each monitoring channel each time the monitoring channel is set as the candidate channel and initializes the preliminary judgment variable of each monitoring channel each time the monitoring channel is set as the non-candidate channel.

The increasing block 51 increases the final judgment variable by a renewal value each time the preliminary judgment variable of at least one monitoring channel reaches or exceeds a preliminary judgment value in one measuring period Tms.

The outputting block 52 judges, in response to the final judgment variable reaching a final judgment threshold value, that wave attenuating things exist to attenuate at least one of the radar waves directed toward the radome 3c and the section 20 and outputs information indicating the existence of the wave attenuating things. For example, in response to the outputting of the information, an alarm lamp is activated, or a buzzer is actuated.

When the level of one monitoring channel is temporarily reduced due to the reception of multi-path reflected waves or the like, the monitoring channel is set as a candidate channel. Therefore, the preliminary judgment variable of the monitoring channel is repeatedly incremented for a short time. However, the increase of the variable is not started until the variable reaches the preliminary judgment value. Accordingly, the sensor can prevent a misjudgment based on multi-path reflected waves or the like that wave attenuating things attenuate the radar wave directed toward the radome 3c.

Further, wave attenuating things are sometimes moved on/over the radome 3c. In this case, the attenuating things currently attenuate the radar wave directed toward one monitoring channel and attenuate the radar wave directed toward another monitoring channel at a next time. Therefore, even when the preliminary judgment variable of one monitoring channel once reaches the preliminary judgment value to increase the final judgment variable, the monitoring channel is set as a non-candidate channel, and the preliminary judgment variable of this channel is initialized. However, the preliminary judgment variable of another monitoring channel soon reaches the preliminary judgment value to continue increasing the final judgment variable. Accordingly, even when wave attenuating things are moved on/over the radome 3c, the detecting unit 41 of the sensor 3 can reliably detect the existence of the wave attenuating things to output information regarding the things.

Moreover, the temporary reduction of the level in one monitoring channel due to multi-path reflected waves or the like and the continuing reduction of the level in another monitoring channel due to wave attenuating things are sometimes caused simultaneously. However, the plurality of candidate channels can be set every measuring period Tms. Therefore, even when one monitoring channel corresponding to the temporary reduction of the level is set as a candidate channel, another monitoring channel corresponding to the continuing reduction of the level can be reliably set as another candidate channel. Accordingly, even when both the temporary reduction in one monitoring channel and the continuing reduction in another monitoring channel are simultaneously caused, the detecting unit 41 of the sensor 3 can reliably detect the existence of the wave attenuating things and can output information regarding the things.

The detecting unit 41 may further have a minimum level channel extracting block 53, a maximum-minimum level difference calculating block 54 and a final judgment variable initializing block 55.

The extracting block 53 extracts a minimum level channel, having a minimum level among the levels of the monitoring channels, from the monitoring channels every reception period Trc. The calculating block 54 calculates a difference in level between the maximum level channel and the minimum level channel as a maximum-minimum level difference every reception period Trc.

The initializing block 55 initializes the final judgment variable each time the preliminary judgment variable of at least one monitoring channel is lower than the preliminary judgment value in one measuring period Tms and at least one of the maximum-minimum level differences in the reception periods Trc of the measuring period Tms is equal to or smaller than a cancellation threshold value. The judging block 52 stops outputting the information each time the final judgment variable is initialized.

The wave attenuating thing detecting process may be performed without using the frequency spectra or selecting the monitoring channels from the receiving channels. That is, this detecting process may be performed based on an electric power level at an arbitrary frequency in the received signal Sr of each receiving channel.

Figure 6:
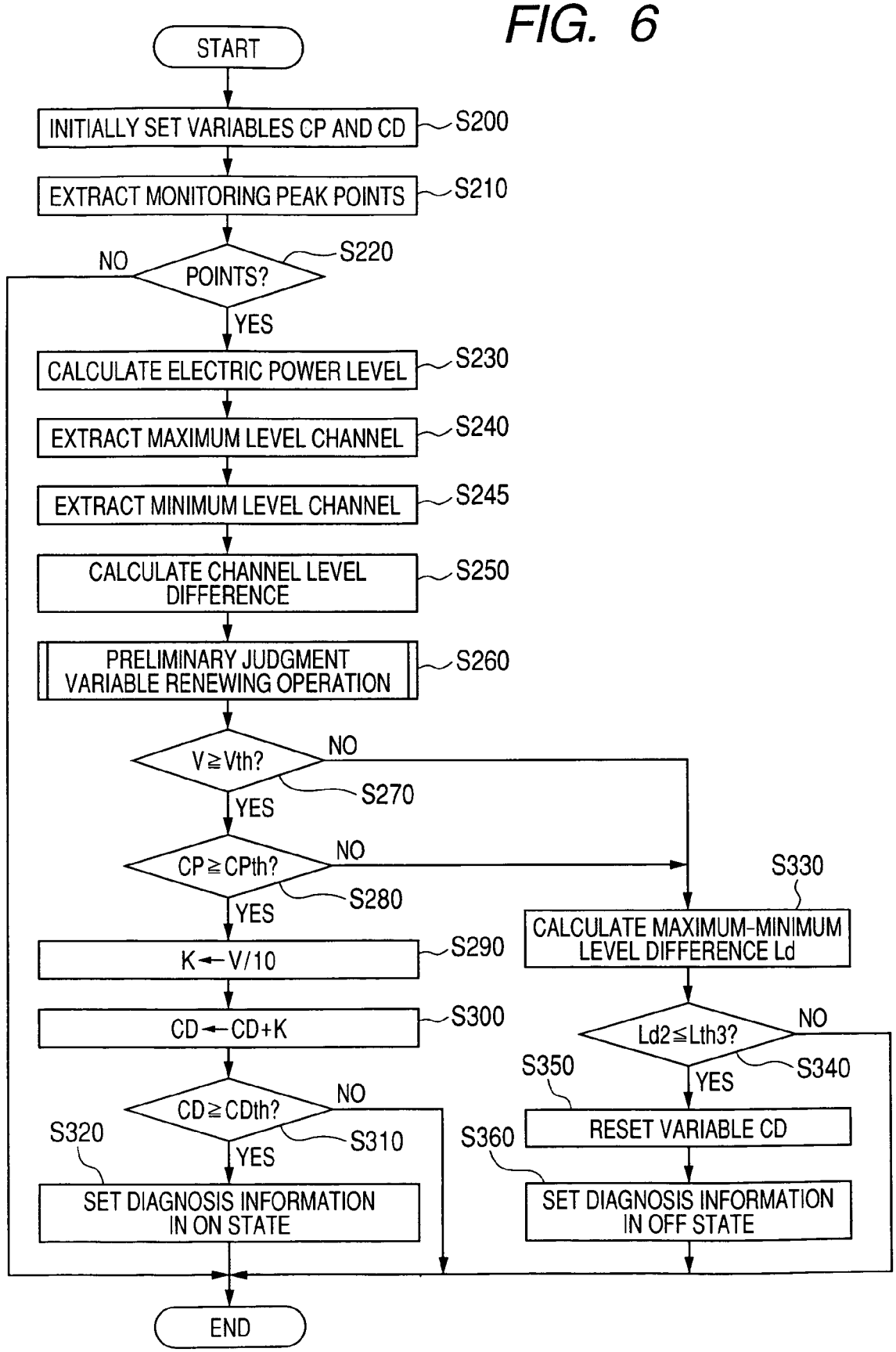
FIG. 6 is a flow chart of a soiling thing detecting process performed in the wave attenuating thing detecting unit shown in FIG. 5.

An example of the wave attenuating thing detecting process at step S160 will be described in more detail with reference to FIG. 6. FIG. 6 is a flow chart of a soiling thing detecting process performed in the detecting unit 41 of the sensor 3 every measuring period Tms. This soiling thing detecting process is an example of the wave attenuating thing detecting process. Therefore, the detecting unit 41 acts as a soiling thing detecting unit.

As shown in FIG. 6, at step S200, when an ignition switch (not shown) is set in the on-state to start driving an engine of the vehicle, the block 42 of the detecting unit 41 initially sets both a preliminary judgment variable CP and a final judgment variable CD at zero, and assigns the variable CP to each monitoring channel. Then, the detecting unit 41 is placed in the preliminary judgment period.

At step S210, the block 44 extracts each of the peak points as a monitoring peak point when the peak point is placed in a predetermined monitoring frequency zone and has the specific level being equal to or higher than a second peak extracting threshold value. The second peak extracting threshold value is set to be larger than the first peak extracting threshold value. The predetermined monitoring frequency zone corresponds to the distance zone ranging from 20 m to 80 m. When the relative speed is equal to zero, the frequency of the beat signal corresponds to the target distance between the current vehicle and the target object. Therefore, the frequency of the frequency spectrum corresponds to the target distance.

This detecting process is performed only for monitoring channels of which the frequency spectra have the monitoring peak points. Therefore, the differences among levels at the peak points of the receiving channels can be calculated with high precision, and the reliability in the judgment about the existence of wave attenuating things can be improved.

At step S220, it is judged whether or not at least two monitoring peak points are extracted from the peak points at least in one reception period Trc of this measuring period Tms. In case of a negative judgment, this process is ended. In contrast, in case of an affirmative judgment, at step S230, the level of the monitoring peak point is calculated for each channel every reception period Trc. In this case, because each reception period Trc is composed of the up and down periods in the same manner as the up and down periods Tu and Td of the modulation period Tmd, the electric power level in the up or down period of each reception period Trc is calculated as the level in the reception period Trc, or the average of levels in the up and down periods of each reception period Trc is calculated as the level in the reception period Trc.

At step S240, in the block 46, one receiving channel having the maximum level among those at the monitoring peak points of the receiving channels is extracted as a maximum level channel every reception period Trc.

At step S245, one receiving channel having the minimum level among those at the monitoring peak points of the receiving channels is extracted as a minimum level channel every reception period Trc.

At step S250, a channel level difference Ld1 between the maximum level and the level of the monitoring peak point is calculated for each channel every reception period Trc.

At step S260, a preliminary judgment variable renewing operation is performed. In this operation, the preliminary judgment variable CP assigned to each channel is renewed or maintained according to the channel level differences of the receiving channel in this measuring period Tms.

Figure 7:
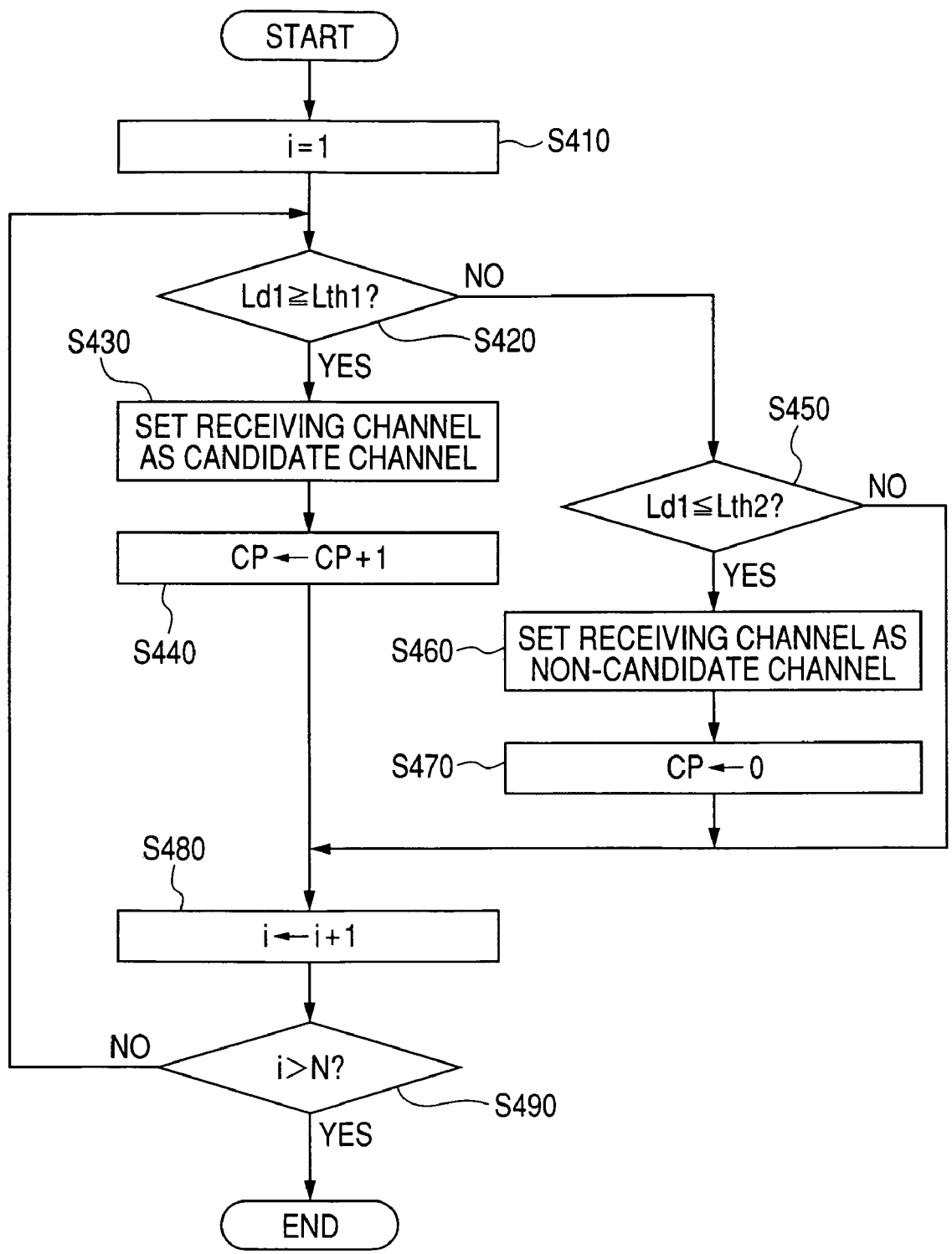
FIG. 7 is a flow chart of the preliminary judgment variable renewing process performed in the wave attenuating thing detecting unit.

FIG. 7 is a flow chart of the preliminary judgment variable renewing operation.

As shown in FIG. 7, at step S410, the channel number i is initially set at 1. At step S420, it is judged whether or not each of the three channel level differences Ld1 of the receiving channel CHi in all three reception periods Trc is equal to or larger than a candidate threshold value Lth1 (e.g., Lth1 corresponds to 11 dB). In case of an affirmative judgment, at step S430, the receiving channel CHi is set as a candidate channel. Then, at step S440, the preliminary judgment variable CP of the candidate channel CHi is incremented by one, and the procedure proceeds to step S480. In case of a negative judgment at step S420, the procedure proceeds to step S450.

At step S450, it is judged whether or not at least one of the channel level differences Ld1 of the receiving channel CHi in all three reception periods Trc is equal to or smaller than a non-candidate threshold value Lth2 (e.g., Lth2 corresponds to 9 dB). This non-candidate threshold value is lower than the candidate threshold value. In case of an affirmative judgment, at step S460, the receiving channel CHi is set as a non-candidate channel. Then, at step S470, the preliminary judgment variable CP of the non-candidate channel CHi is reset at zero. In case of a negative judgment at step S450, the procedure proceeds to step S480.

At step S480, the channel number i is incremented by one. Then, at step S490, it is judged whether or not the channel number i exceeds the value N. In case of a negative judgment, the procedure returns to step S420. In contrast, in case of an affirmative judgment, this process is ended.

Therefore, in the preliminary judgment variable renewing process, the preliminary judgment variable CP of each candidate channel is incremented in this measuring period Tms, and the variable CP of each non-candidate channel is reset at zero in this measuring period Tms. Further, the preliminary judgment variable CP of each channel not set as the candidate channel or the non-candidate channel is maintained.

For example, when the detecting performance is degraded in one receiving channel due to soiling things attached to the radome 3c, the receiving channel is set as a candidate channel. When the detecting performance is degraded in another receiving channel due to multi-path reflected waves or the like, the receiving channel is also set as a candidate channel. Therefore, even when the performance degradation due to soiling things and the performance degradation due to multi-path reflected waves or the like are simultaneously caused in respective receiving channels, each of the channels can be set as a candidate channel.

Returning to FIG. 6, at step S270, the processor 26 receives information of the vehicle speed V (km/hr) from the ECU 30 and judges whether or not the vehicle speed V is equal to or higher than a lower limit speed Vth (e.g., 10 km/hr). In case of an affirmative judgment, at step S280, it is judged in this measuring period Tms whether or not the preliminary judgment variable CP of at least one receiving channel is equal to or higher than a preliminary judging threshold value CPth (e.g., 10). In this case, as the second peak extracting threshold value becomes low, the value CPth is preferably set to become high. In case of an affirmative judgment, at step S290, a renewal value K is calculated according to the equation (1).

$$K = V(\text{km/hr})/10 \quad (1)$$

Then, at step S300, the final judgment variable CD is increased by the renewal value K according to the equation (2).

$$CD = CD + K \quad (2)$$

Then, at step S310, it is judged whether or not the judging variable CD is equal to or higher than a final judging threshold value CDth (e.g., 100). In case of a negative judgment, this process is ended. In contrast, in case of an affirmative judgment, at step S320, diagnosis information indicating that the outer surface of the radome 3c is soiled is set in the on state. Then, this process is ended. Therefore, the sensor 3 starts outputting the diagnosis information to the ECU 30 or continues outputting the diagnosis information. For example, in response to the outputting of the diagnosis information, an alarm lamp is activated, or a buzzer is actuated. Therefore, the driver can acknowledges the existence of soiling things attached to the radome 3c.

Because the judging variable CD is increased when the judging variable CP of at least one receiving channel is equal to or higher than the value CPth, even when soiling things are moved on the radome 3c to change the first channel corresponding to the performance degradation to the second channel, the sensor 3 can reliably detect the performance degradation caused by the soiling things. More specifically, even when the judging variable CP of the first channel reaching or exceeding the value CPth is reset at zero due to the movement of the soiling things, the variable CD is still increased when the judging variable CP of the second channel reaches the value CPth in response to the soiling things moved to the second channel. Therefore, the judging variable CD finally reaches the value CDth, and the diagnosis information is outputted.

Further, the diagnosis information is not set in the on state even when the variable CP reaches the value CPth, but the diagnosis information is set in the on state in response to the variable CD reaching the value CDth. Therefore, even when the performance degradation is temporarily caused by multi-pass reflected waves or the like, the sensor 3 prevents the outputting of the diagnosis information.

In contrast, in case of a negative judgment at step S270 or step S280, the procedure proceeds to step S330. At step S330, a difference in level between the maximum level channel and the minimum level channel is calculated as a maximum-minimum level difference Ld2 for each reception period Trc of this measuring period Tms.

Then, at step S340, it is judged whether or not each of the maximum-minimum level differences Ld2 in all three reception periods Trc of this measuring period Tms are equal to or smaller than a cancellation threshold value Lth3 (e.g., Lth3 corresponds to 7 dB). When at least one maximum-minimum level difference Ld2 is equal to or larger than the cancellation threshold value Lth3 (negative judgment), this process is ended. In contrast, when all the maximum-minimum level differences Ld2 are equal to or smaller than the cancellation threshold value Lth3 (affirmative judgment), the sensor 3 judges that no soiling things are attached to the radome 3c. Therefore, at step S350, the judging variable CD is reset at zero in this measuring period Tms. Then, at step S360, diagnosis information indicating that the outer surface of the radome 3c is made soiled is set in the off state. Then, this process is ended. That is, the outputting of the diagnosis information is stopped, or no diagnosis information is outputted to the ECU 30.

Figure 8:
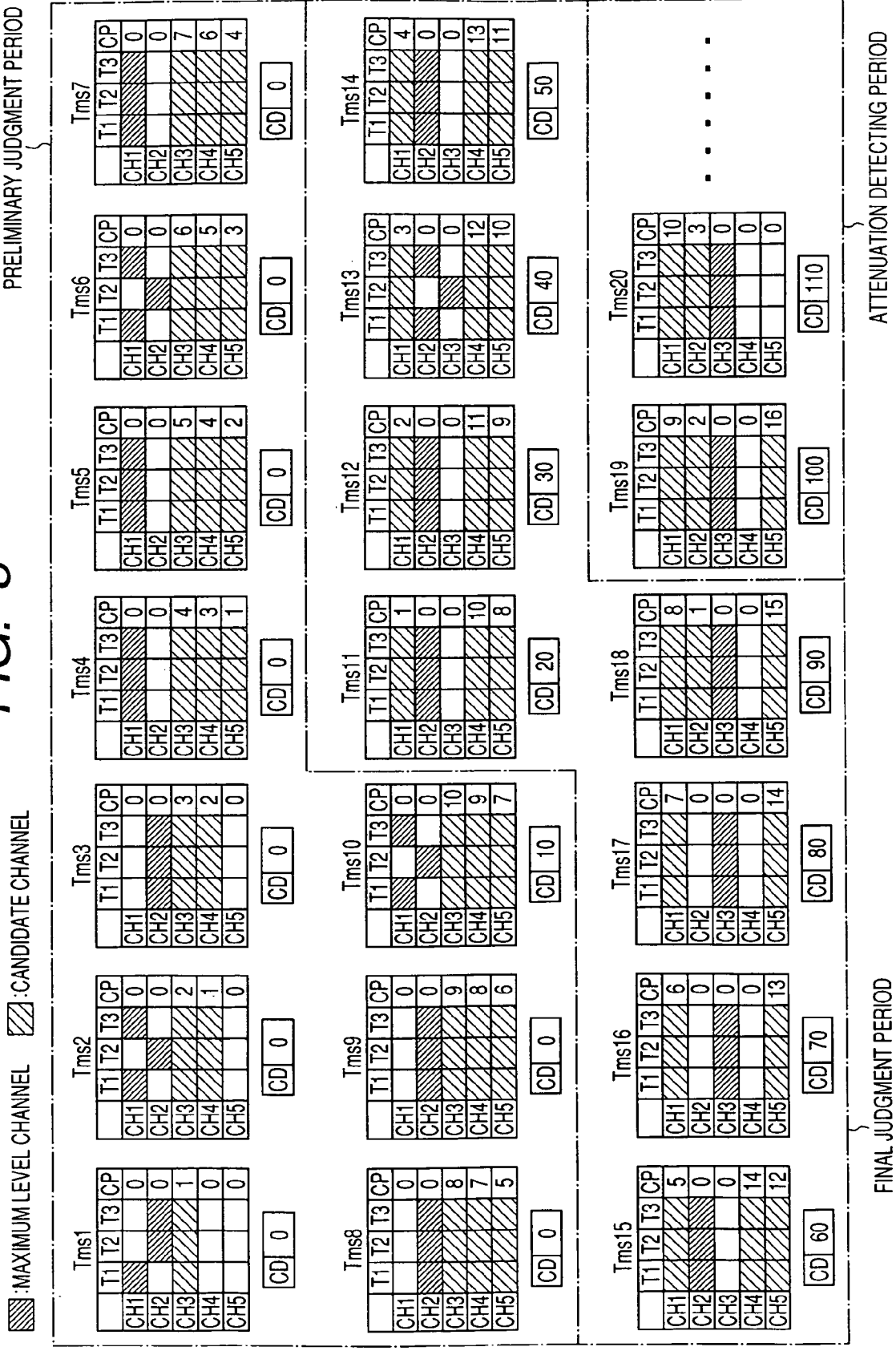
FIG. 8 is an explanatory view showing an example of maximum level channels and candidate channels set every measuring period in the soiling thing detecting process performed in the wave attenuating thing detecting unit.

FIG. 8 is an explanatory view showing an example of the maximum level channels and the candidate channels set every measuring period Tms in the soiling thing detecting process.

In the example shown in FIG. 8, soiling things start interrupting the radio wave from the third channel CH3 in the first, second and third modulation periods T1, T2 and T3 of the first measuring period Tms1, spreads out to the fifth channel CH5 through the fourth channel CH4 in the fourth measuring period Tms4, and continues interrupting the radio wave from the third, fourth and fifth channels CH3 to CH5 during the fourth to tenth measuring periods Tms4 to Tms10. Then, the soiling things at the third channel CH3 are moved away to the fourth and fifth channels CH4 and CH5 in the eleventh measuring period Tms11, while the soiling things remain at the fourth and fifth channels CH4 and CH5 in the eleventh to fifteenth measuring periods Tms11 to Tms15. Then, the soiling things at the fourth channel are moved away to the fifth channel CH5 in the sixteenth measuring period Tms16, and the soiling things remains at the fifth channel CH5 in the sixteenth to nineteenth measuring periods Tms16 to Tms19. Other soiling things starts interrupting the radio wave from the first channel CH1 in the eleventh measuring period Tms11, remains at the first channel Ch1 during the eleventh to seventeenth measuring periods Tms11 to Tms17, spreads out to additionally interrupt the radar wave from the second channel CH2 in the eighteenth measuring period Tms18, and remains at the first and second channels CH1 and CH2 in the eighteenth and twentieth measuring periods Tms18 to Tms20.

As shown in FIG. 8, the preliminary judgment period is first started. When at least one candidate channel is extracted from the receiving channels $CH_1$ to $CH_N$ in one measuring period Tms, the preliminary judgment variable CP of each candidate channel is incremented. In contrast, when at least one non-candidate channel is extracted from the receiving channels $CH_1$ to $CH_N$ (not shown), the preliminary judgment variable CP of each non-candidate channel is reset at zero. The preliminary judgment variable CP of each channel not set as the candidate channel or the non-candidate channel is maintained (not shown).

When the preliminary judgment variable CP of third channel reaches the value CPth (e.g., 10) in the tenth measuring period Tms, the renewal of the judging variable CD is started. Therefore, the preliminary judgment period is ended, and the final judgment period is started. For example, when the vehicle speed is equal to 100 km/hr, the judging variable CD is increased by the renewal value K=10.

In the final judgment period, the judging variable CD is increased every measuring period Tms. When the judging variable CD reaches the value CDth (e.g., 100) in the nineteenth measuring period Tms, the final judgment period is ended, and the attenuation detecting period is started. Therefore, the diagnosis information is set in the on state.

In contrast, in the preliminary judgment period, the final judgment period or the wave attenuation detecting period, when the maximum-minimum level differences in all three reception periods Trc becomes equal to or smaller than the cancellation threshold value in one measuring period Tms (not shown), the judging variable CD is reset at zero, and the diagnosis information is set in the off state.

As described above, in this sensor 3, the processor 26 judges in both the preliminary judgment period and the final judgment period whether or not the wave attenuation occurs in the section 20. That is, the preliminary judgment variable CP of each channel is monitored in the preliminary judgment period. This variable CP indicates the continuation time the receiving channel has been placed in conditions of the candidate channel. When at least one receiving channel is placed in conditions of the candidate channel for a preliminary period of time without being placed in conditions of the non-candidate channel, the processor 26 preliminary judges that the wave attenuation occurs in the section 20 at a high probability. In response to this preliminary judgment, the final judgment variable CD is monitored in the final judgment period. This variable CD indicates the continuation time the wave attenuation still occurs at least in one receiving channel of the section 20 at a high probability. When the wave attenuation still occurs in the section 20 at a high probability in the final judgment period, the processor 26 finally judges that the wave attenuation certainly occurs in the section 20.

Therefore, when the intensity of the received signal Sr received in the section 20 is temporarily reduced, no channel of the section 20 is set as a candidate channel for the preliminary period of time, or any channel of the section 20 is not still set as a candidate channel in the final judgment period.

Accordingly, even when the intensity of the received signal Sr received in the section 20 is temporarily reduced due to some causes such as multi-path reflected waves, the sensor 3 can reliably judge that no wave attenuation occurs in the section 20. That is, the degradation of the wave detecting performance caused by wave attenuating things can be reliably distinguished from the performance degradation temporarily caused by multi-path reflected waves.

Further, the final judgment variable CD is not increased based on the variable CP of only the specific candidate channel reaching the value CPth, but is increased when the variable CP reaches or exceeds the value CPth in at least one candidate channel. Accordingly, even when wave attenuating things are moved on the surface of the radome 3c so as to change the receiving channel of which the variable CP reaches or exceeds the value CPth, the sensor 3 can reliably judge that wave attenuation occurs in the section 20.

Moreover, the processor 26 simultaneously monitors the values CP of the plurality of candidate channels while increasing each variable CP based on the channel level difference of the corresponding candidate channel. Accordingly, even when the continuing reduction of the intensity of the received signal Sr due to wave attenuating things at one candidate channel and the temporary reduction of the intensity of the received signal Sr due to multi-path reflected waves at another candidate channel simultaneously occur, the sensor 3 can reliably judge that wave attenuation occurs in the section 20. That is, the existence of wave attenuating things causing the performance degradation can be reliably detected even when the performance degradation due to the wave attenuating things and the performance degradation due to multi-path reflected waves are simultaneously caused.

Furthermore, as the vehicle speed is increased, the attachment of wave attenuating things to the radome 3c is promoted or accelerated. In this embodiment, the renewal value K for the final judgment variable CD is increased with the vehicle speed (step S290 and S300 in FIG. 6). Therefore, as the vehicle speed is increased, the variable CD is increased to the value CDth in a shorter time. This means that a period of time required to detect the existence of wave attenuating things causing the performance degradation is shortened with the increase of the vehicle speed. Accordingly, the sensor 3 can effectively and quickly judge that wave attenuation occurs in the section 20.

Still further, when the vehicle speed is sufficiently low, there is a low probability that wave attenuating things are attached to the surface of the radome 3c. In contrast, changes in the local environment surrounding the radar sensor 3 become small, so that circumstances in the transmission path of the radar wave transmitted to an object and reflected from the object become stable. In this case, when the surrounding environment generates multi-path reflected waves, there is a high probability that these multi-path reflected waves are successively received only in a single channel or a limited group of channels. Therefore, the degradation of the wave detecting performance is caused by wave attenuating things at a low probability but is caused by multi-path reflected waves at a high probability. In this embodiment, when the vehicle speed is sufficiently low, the variable CD is not increased (step S270 in FIG. 6). This means that the sensor 3 stops detecting the performance degradation. Accordingly, during the running of the vehicle at a low speed or the parking of the vehicle, the processor 26 prevents the judgment caused by multi-path reflected waves.

Still further, the processor 26 substantially calculates a frequency spectrum of the received signal Sr received in each channel (step S120 in FIG. 4), specifies the electric power level at the peak point of the frequency spectrum (step S130 and S140), selects monitoring peak points from the peak points of the frequency spectra (step S210 in FIG. 6), extracts the maximum level channel having the maximum level from the receiving channels (step S240), and calculates the channel level difference of each channel from the maximum level (step S250). Accordingly, the processor 26 can calculate the channel level differences of the receiving channels with high precision, so that the sensor 3 can improve the reliability of the judgment.

This embodiment should not be construed as limiting the present invention to the structure of the embodiment, and the structure of this invention may be combined with that based on the prior art. For example, in this embodiment, only one peak point is extracted from the frequency spectrum of each receiving channel to calculate the channel level difference of the receiving channel or the maximum-minimum level difference every reception period Trc (step S250 or S330). However, a plurality of peak points may be extracted from the frequency spectrum of each receiving channel to calculate a plurality of channel level differences for each receiving channel when the monitoring channel has a plurality of monitoring peak points. In this case, when all channel level differences of one monitoring channel in one measuring period Tms are equal to or larger than the candidate threshold value, the monitoring channel is set as a candidate channel. In contrast, when at least one channel level difference of one monitoring channel having at least one monitoring peak point in one reception period Trc of one measuring period Tms is equal to or smaller than the non-candidate threshold value, the monitoring channel is set as a non-candidate channel.

Further, there are three modulation periods Tmd and three reception periods Trc for each measuring period Tms. However, four modulation periods Tmd and four reception periods Trc or more may be set for each measuring period Tms. Further, one modulation period Tmd and one reception period Trc or two modulation periods Tmd and two reception periods Trc may be set for each measuring period Tms.

What is claimed is:

1. A radar sensor which receives a radar wave, reflected from a target object and transmitted through a wave transmission member in each of a plurality of antenna elements corresponding to a plurality of receiving channels, as a received signal while judging existence of a wave attenuator attenuating at least one of the radar waves directed toward the wave transmission member, the radar sensor comprising:

a preparation block that sets each of a preliminary judgment variable and a final judgment variable at an initial value, assigns the preliminary judgment variable to each of the receiving channels, and sets a first period of time and a second period of time including one first period of time or a plurality of first periods of time;

a detecting block that detects an electric power level of the received signal received in each antenna element as the level of the corresponding receiving channel every first period;

a maximum level channel extracting block that extracts a maximum level channel, having a maximum level among the levels of the receiving channels, from the receiving channels every first period;

a difference calculating block that calculates a channel level difference between the maximum level of the maximum level channel and the level of each of the receiving channels other than the maximum level channel every first period;

a candidate channel setting block that sets one receiving channel corresponding to one channel level difference, which is calculated in one second period and is equal to or larger than a candidate threshold value, as a candidate channel for each of the receiving channels other than the maximum level channel every second period;

a non-candidate channel setting block that sets one receiving channel corresponding to one channel level difference, which is calculated in one second period and is smaller than a non-candidate threshold value being lower than the candidate threshold value, as a non-candidate channel for each of the receiving channels other than the maximum level channel every second period;

a preliminary judgment variable incrementing block that increments the preliminary judgment variable of each receiving channel each time the receiving channel is set as the candidate channel and initializes the preliminary judgment variable of each receiving channel each time the receiving channel is set as the non-candidate channel;

a final judgment variable increasing block that increases the final judgment variable by a renewal value each time the preliminary judgment variable of at least one receiving channel reaches or exceeds a preliminary judgment value in one second period; and an outputting block that outputs information indicating existence of the wave attenuator in response to the final judgment variable reaching a final judgment threshold value.

2. The radar sensor according to claim 1, wherein the preparation block sets the second period including the plurality of first periods of time, the candidate channel setting block sets one receiving channel, of which the channel level differences in one second period are equal to or larger than the candidate threshold value, as the candidate channel for each of the receiving channels other than the maximum level channel every second period, and the non-candidate channel setting block sets one receiving channel, of which the channel level differences in one second period are smaller than the non-candidate threshold value, as the non-candidate channel for each of the receiving channels other than the maximum level channel every second period.

3. The radar sensor according to claim 1, wherein the final judgment variable increasing block receives a moving speed of a vehicle, on which the radar sensor is mounted, and sets the renewal value to be increased with the moving speed.

4. The radar sensor according to claim 1, wherein the final judgment variable increasing block receives a moving speed of a vehicle, on which the radar sensor is mounted, and stops increasing the final judgment variable in response to the moving speed being smaller than a lower limit value.

5. The radar sensor according to claim 1, further comprising:
- a frequency changing block that changes a frequency of the radar wave with time to output the radar wave having the changing frequency to the target object, and
- a peak point extracting block that produces a frequency spectrum, indicating a relationship between frequency and electric power of the received signal in each receiving channel, from the received signal every first period, and extracts a peak point corresponding to a specific frequency and a specific electric power level, which is largest among levels of each frequency spectrum, from the frequency spectrum,
- wherein the maximum level channel extracting block extracts the maximum level channel, having a maximum level among the specific levels of the receiving channels, from the receiving channels.

6. The radar sensor according to claim 5, further comprising a monitoring channel selecting block that selects, from each receiving channel, a monitoring channel having the peak point of which the specific frequency is placed within a predetermined frequency range and of which the specific level is higher than a peak level threshold value,
- wherein the maximum level channel extracting block extracts the maximum level channel, having a maximum level among the specific levels of the monitoring channels, from the monitoring channels,
- the difference calculating block calculates the channel level difference from the specific level of each of the monitoring channels other than the maximum level channel,
- the candidate channel setting block sets one monitoring channel, of which the channel level difference is equal to or larger than the candidate threshold value, as the candidate channel for each of the monitoring channels other than the maximum level channel,
- the non-candidate channel setting block sets one monitoring channel, of which the channel level difference is smaller than the non-candidate threshold value, as the non-candidate channel for each of the monitoring channels other than the maximum level channel,
- the preliminary judgment variable incrementing block increments the preliminary judgment variable of each monitoring channel each time the monitoring channel is set as the candidate channel in one first period and initializes the preliminary judgment variable of each non-candidate channel each time the monitoring channel is set as the non-candidate channel in one first period, and
- the final judgment variable increasing block increases the final judgment variable by the renewal value each time the preliminary judgment variable of at least one monitoring channel is equal to or higher than the preliminary judgment value in one first period.

7. The radar sensor according to claim 6, wherein the signal receiving block heightens the preliminary judgment value when the peak level threshold value is lowered.

8. The radar sensor according to claim 1, further comprising:
- a minimum level channel extracting block that extracts a minimum level channel, having a minimum level among the levels of the receiving channels, from the receiving channels every first period;
- a maximum-minimum level difference calculating block that calculates a difference in level between the maximum level channel and the minimum level channel as a maximum-minimum level difference every first period; and
- a final judgment variable initializing block that initializes the final judgment variable each time at least one of the maximum-minimum level differences in the first periods of one second period is equal to or smaller than a cancellation threshold value,
- wherein the final judging block stops outputting the information each time the final judgment variable is initialized.

* * * * *